(12) United States Patent
Kunz et al.

(10) Patent No.: US 12,255,582 B2
(45) Date of Patent: Mar. 18, 2025

(54) OUTDOOR PHOTOLUMINESCENCE IMAGING OF PHOTOVOLTAIC MODULES

(71) Applicant: NEWSOUTH INNOVATIONS PTY LIMITED, Sydney (AU)

(72) Inventors: Oliver Kunz, Sydney (AU); Germaine Antoine Rey, Sydney (AU); Thorsten Trupke, Sydney (AU); Appu Rshikesan Paduthol, Sydney (AU)

(73) Assignee: NEWSOUTH INNOVATIONS PTY LIMITED, Sydney (AU)

( * ) Notice: Subject to any disclaimer, the term of this patent is extended or adjusted under 35 U.S.C. 154(b) by 276 days.

(21) Appl. No.: 18/009,893

(22) PCT Filed: Jun. 11, 2021

(86) PCT No.: PCT/AU2021/050604
§ 371 (c)(1),
(2) Date: Dec. 12, 2022

(87) PCT Pub. No.: WO2021/248209
PCT Pub. Date: Dec. 16, 2021

(65) Prior Publication Data
US 2023/0238919 A1 Jul. 27, 2023

(30) Foreign Application Priority Data
Jun. 12, 2020 (AU) ............................... 2020901949

(51) Int. Cl.
*H02S 50/15* (2014.01)
*G01N 21/64* (2006.01)
*G02F 1/01* (2006.01)

(52) U.S. Cl.
CPC ......... *H02S 50/15* (2014.12); *G01N 21/6489* (2013.01); *G02F 1/0147* (2013.01);
(Continued)

(58) Field of Classification Search
CPC .. G01N 21/6489; G01N 21/645; G01N 21/66; G01N 21/6428; G01N 21/67;
(Continued)

(56) References Cited

U.S. PATENT DOCUMENTS

| 3,641,344 A | 2/1972 | Markle |
| 4,724,326 A | 2/1988 | Poultney et al. |
| 6,329,660 B1 | 12/2001 | Maier |

FOREIGN PATENT DOCUMENTS

CN 102859338 A * 1/2013 ......... G01N 21/6408

OTHER PUBLICATIONS

International Search Report and Written Opinion in PCT/AU2021/050604. Mailed Aug. 19, 2021. 17 pages.

* cited by examiner

*Primary Examiner* — Don K Wong
(74) *Attorney, Agent, or Firm* — Meunier Carlin & Curfman LLC

(57) ABSTRACT

Methods and apparatus are presented for measuring a photoluminescence (PL) response, preferably a spatially resolved image of a PL response, from an object exposed to solar irradiation. In certain embodiments signals from the object are measured in two or more different spectral bands selected such that one of the measured signals has a higher PL component relative to ambient reflectance compared to another measured signal, enabling the PL component to be enhanced by a suitable differencing procedure. In other embodiments a signal from an object is measured in a spectral band selected such that at least 20% of the measured signal comprises PL generated from the object by the solar irradiation. The methods and apparatus have particular application to outdoor inspection of photovoltaic modules without having to modulate the operating point of the modules.

27 Claims, 7 Drawing Sheets

(52) U.S. Cl.
CPC ............. *G01N 2021/6471* (2013.01); *G01N 2201/0686* (2013.01); *G02F 2203/055* (2013.01); *G02F 2203/11* (2013.01)

(58) Field of Classification Search
CPC ... G01N 2021/646; H02S 50/00; H02S 50/10; F21S 8/006; G02F 2203/00; G02F 2203/05; G02F 2203/055; G02F 2203/12
See application file for complete search history.

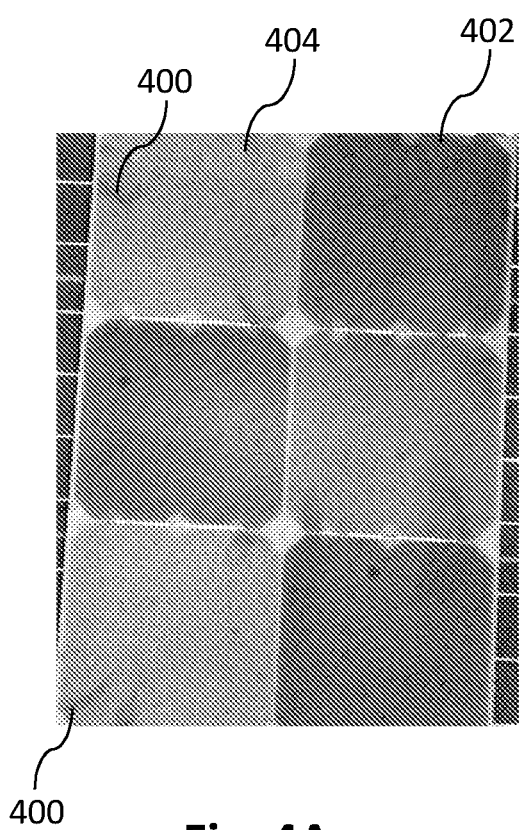
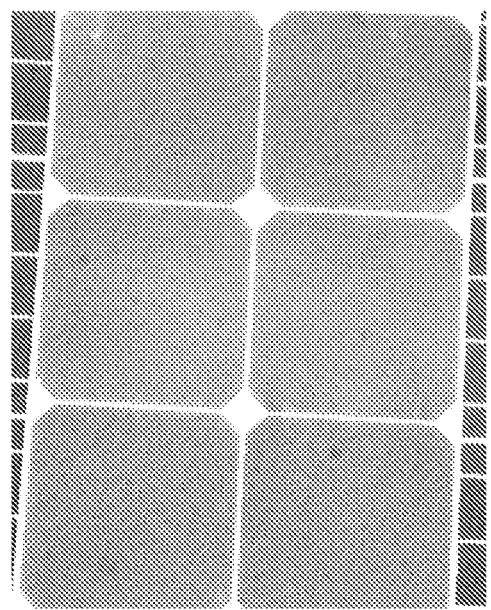
Fig. 4A　　　　　　　　　　　Fig. 4B
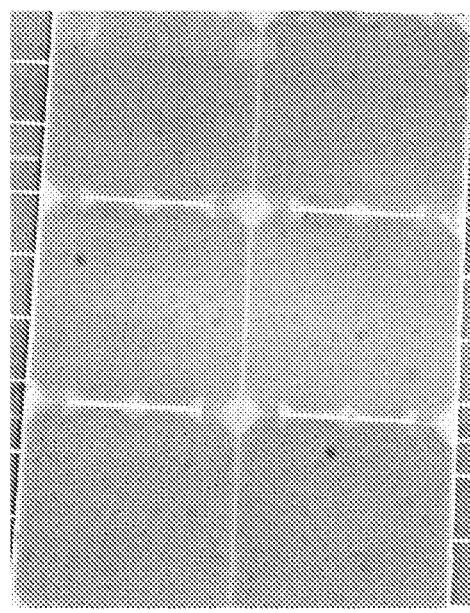
Fig. 4C

OUTDOOR PHOTOLUMINESCENCE IMAGING OF PHOTOVOLTAIC MODULES

CROSS-REFERENCE TO RELATED APPLICATION

This application is a national stage application under 35 U.S.C. § 371 of PCT/AU2021/050604 filed Jun. 11, 2021, which is hereby incorporated by reference in its entirety.

FIELD OF THE INVENTION

The invention relates to methods and apparatus for inspection of materials, using measurements of photoluminescence generated by solar irradiation. The invention has been developed primarily for inspection of field-installed photovoltaic modules using imaging of photoluminescence generated with solar irradiation, and will be described with reference to this particular application. However, it will be appreciated that the invention is not limited to this particular field of use.

RELATED APPLICATIONS

The present application claims priority from Australian Provisional Patent Application No 2020901949 filed on 12 Jun. 2020, the contents of which are incorporated herein by reference.

BACKGROUND OF THE INVENTION

Any discussion of the prior art throughout the specification should in no way be considered as an admission that such prior art is widely known or forms part of the common general knowledge in the field anywhere in the world.

Photovoltaic cells, either in rooftop systems or commercial solar farms, are making an increasingly significant contribution to power generation in many countries. The vast majority of solar installations are based on modules containing arrays of crystalline silicon photovoltaic cells, with a typical module comprising a rectangular array of sixty or seventy-two photovoltaic cells wired as three strings of twenty or twenty-four cells connected in series, with a bypass diode usually connected in parallel to each string of cells. Other crystalline silicon module configurations consisting of half cells and so-called shingled modules are also currently getting increasing market share. These more recent types of modules have various configurations of series-connected sub-strings of cells with bypass diodes connected to the sub-strings. Photovoltaic modules based on thin film materials such as cadmium telluride, copper indium gallium selenide (CIGS) or amorphous silicon are also being installed but in much lower quantities. Photovoltaic modules, and in particular the constituent cells, are relatively fragile and are frequently damaged during module manufacture, transportation to the installation site or during installation. Furthermore, they undergo gradual degradation, and may also suffer sudden substantial damage from extreme weather events such as storms, in particular hailstorms, during operation in the field. Because the cells in a module are generally connected in series, a single defective cell can disrupt an entire sub-string, significantly reducing the overall efficiency of a module. Failure of the protective bypass diodes is also quite common, causing additional problems in solar installations. Consequently, it is important to be able to monitor photovoltaic modules in the field, i.e. after installation, to identify defective modules for replacement or for evaluating the health and value of a photovoltaic installation.

Thermography, in which thermal imaging cameras mounted on drones or the like look for 'hot spots' in modules, is a commonly used technique for inspecting modules in the field. Thermography has the advantage of being suitable for rapid inspection of large area installations, but can only identify certain faults, and only those that are already causing serious degradation of electrical performance. Thermography cannot, for example, identify non-electrical faults such as glass breakage or small cell cracks that have the potential to grow and impede current flow. Luminescence-based inspection techniques such as electroluminescence (EL) or photoluminescence (PL) imaging, in which the spatial distribution of luminescence from charge carrier recombination is measured with a charged coupled device (CCD) camera or similar device, can provide high-resolution, spatially resolved, information on many types of faults in photovoltaic modules, including cracks, series resistance problems, shunts and bypass diode failure. EL imaging, where charge carriers are generated by electrical excitation, is routinely used for factory inspection of modules post-manufacture, but is less well suited to in-the-field inspection because of the need for special hardware to be connected electrically either to individual modules or to strings of modules. These electrical connections require modifications to the electrical wiring of the system, which has various associated risks and costs and should therefore be avoided. On the other hand, with PL imaging the charge carriers are generated by optical excitation, with no requirement for electrical contact to the module or modules under test. With the sun being a convenient excitation source, PL imaging offers the possibility of rapid inspection of large solar installations, for example with drone-mounted cameras similar to thermography, but sensitive to a wider range of faults.

Acquisition of PL images of photovoltaic modules in daylight is, however, challenging, since diffuse or specular reflected sunlight from a module under test is typically at least two orders of magnitude greater than the peak of the PL emission from silicon around 1135 nm. Even for thin film modules based on direct bandgap materials such as cadmium telluride that are more efficient emitters than silicon, reflected sunlight tends to swamp the PL response. Published US patent application Nos 2015/0155829 A1 and 2018/0262159 A1 disclose techniques for daylight luminescence imaging in which the operating point of a module under test is modulated electrically, allowing lock-in detection to distinguish the luminescence signal from the ambient sunlight. However, this requires qualified personnel to install the electrical hardware for biasing the module. The operating point of a module can alternatively be modulated optically, in a contactless fashion, by controlled partial shading of the module, as disclosed in R. Bhoopathy et al 'Outdoor photoluminescence imaging of photovoltaic modules with sunlight excitation', Prog. Photovolt. Res. Appl. 26, 69-73 (2018). However, because at least one cell per sub-string has to be shaded during image acquisition, additional images are required to capture PL from every cell in the module under test. This technique also requires particular hardware to be brought into close proximity to the module, which complicates high throughput inspection of large numbers of modules.

Unless the context clearly requires otherwise, throughout the description and the claims the words 'comprising', 'comprises' and the like are to be construed in an inclusive sense as opposed to an exclusive or exhaustive sense. That is, they are to be construed in the sense of 'including, but not limited to'.

Object of the Invention

It is an object of the present invention to overcome or ameliorate at least one of the limitations of the prior art, or to provide a useful alternative. It is an object of the present invention in a preferred form to provide a method for inspecting a photovoltaic module using measurements of photoluminescence generated with solar irradiation, without having to modulate the operating point of the module.

SUMMARY OF THE INVENTION

According to a first aspect of the present invention there is provided a method for measuring a photoluminescence response from an object, the method comprising the steps of:
(i) exposing the object to solar irradiation to generate photoluminescence from the object;
(ii) measuring first and second signals from the object in first and second spectral bands, each of the measured first and second signals having a photoluminescence component and a background component, wherein the first and second spectral bands are selected such that the ratio of the photoluminescence component to the background component is higher in the first measured signal than in the second measured signal; and
(iii) differencing the first and second measured signals to obtain a difference signal having an increased ratio of the photoluminescence component to the background component compared to the first measured signal.

Preferably, the method further comprises the step of interpreting the difference signal to obtain information on one or more properties of the object. In preferred embodiments the first and second signals are measured with an image capture device. Preferably, the method further comprises the step of displaying the difference signal as a difference image.

Preferably, the method further comprises the step of applying a scaling factor to the first measured signal or the second measured signal prior to the differencing step.

In preferred embodiments the first spectral band is overlapping with a peak region of a photoluminescence response of the object. Preferably, the first spectral band is overlapping with an atmospheric absorption band in the spectrum of the solar irradiation. The first and second spectral bands are preferably provided by bandpass filters or equivalent filter combinations.

In preferred embodiments the object comprises silicon. Preferably, the object comprises a photovoltaic module comprising a plurality of silicon photovoltaic cells. In certain embodiments the first spectral band is centred around a wavelength in the range 1120 to 1160 nm. In certain embodiments the second spectral band is centred around a wavelength in the range 1160 to 1250 nm. In other embodiments the second spectral band is centred around a wavelength in the range 1000 to 1120 nm.

According to a second aspect of the present invention there is provided an apparatus for measuring a photoluminescence response from an object exposed to solar irradiation, the apparatus comprising:
a measurement system for measuring first and second signals from an object exposed to solar irradiation, the first and second signals being measured in first and second spectral bands and each having a photoluminescence component generated by the solar irradiation and a background component, wherein the first and second spectral bands are selected such that the ratio of the photoluminescence component to the background component is higher in the first measured signal than in the second measured signal; and
a computer for differencing the first and second measured signals to obtain a difference signal having an increased ratio of the photoluminescence component to the background component compared to the first measured signal.

Preferably, the computer is configured to interpret the difference signal to obtain information on one or more properties of the object. In preferred embodiments the measurement system comprises an image capture device. Preferably, the apparatus comprises a display for displaying the difference signal as a difference image.

Preferably, the computer is configured to apply a scaling factor to the first measured signal or the second measured signal prior to the differencing step.

In preferred embodiments the measurement system comprises one or more filters selected such that the first spectral band is overlapping with a peak region of a photoluminescence response of the object. Preferably, the measurement system comprises one or more filters selected such that the first spectral band is overlapping with an atmospheric absorption band in the spectrum of the solar irradiation. In preferred embodiments the measurement system comprises one or more bandpass filters or equivalent filter combinations.

The apparatus is preferably configured for measuring a photoluminescence response from an object comprising silicon. In preferred embodiments the apparatus is configured for measuring a photoluminescence response from an object comprising a photovoltaic module comprising a plurality of silicon photovoltaic cells. In certain embodiments the measurement system is configured such that the first spectral band is centred around a wavelength in the range 1120 to 1160 nm. In certain embodiments the measurement system is configured such that the second spectral band is centred around a wavelength in the range 1160 to 1250 nm. In other embodiments the measurement system is configured such that the second spectral band is centred around a wavelength in the range 1000 to 1120 nm.

According to a third aspect of the present invention there is provided a method for measuring a photoluminescence response from an object, the method comprising the steps of:
(i) exposing the object to solar irradiation to generate photoluminescence from the object; and
(ii) measuring a signal from the object in a spectral band selected such that at least 20% of the measured signal comprises photoluminescence generated from the object by the solar irradiation.

The spectral band is preferably selected such that at least 50% of the measured signal comprises photoluminescence generated from the object by the solar irradiation. More preferably, the spectral band is selected such that at least 80% of the measured signal comprises photoluminescence generated from the object by the solar irradiation.

In preferred embodiments the object comprises silicon. Preferably, the object comprises a photovoltaic module comprising a plurality of silicon photovoltaic cells. The spectral band preferably has a centre wavelength in the range 1122 to 1130 nm or in the range 1134 to 1136 nm. The spectral band preferably has a FWHM bandwidth of 3.0 nm or less, more preferably 2.0 nm or less, yet more preferably 1.0 nm or less, and still more preferably 0.6 nm or less.

In alternative embodiments the spectral band has a centre wavelength in the range 1367 to 1372 nm, or in the range 1380 to 1383 nm, or in the range 1830 to 1880 nm.

The spectral band is preferably provided by a bandpass filter. In certain embodiments the temperature of the bandpass filter is maintained within a predetermined temperature range. In other embodiments the temperature of the bandpass filter is controlled to tune the centre wavelength of the bandpass filter.

Preferably, the method further comprises the step of interpreting the measured signal to obtain information on one or more properties of the object. In preferred embodiments the signal is measured with an image capture device.

According to a fourth embodiment of the present invention there is provided an apparatus for measuring a photoluminescence response from an object exposed to solar irradiation, the apparatus comprising a measurement system for measuring a signal from an object exposed to solar irradiation, the signal being measured in a spectral band selected such that at least 20% of the measured signal comprises photoluminescence generated from the object by the solar irradiation.

The spectral band is preferably selected such that at least 50% of the measured signal comprises photoluminescence generated from the object by the solar irradiation. More preferably, the spectral band is selected such that at least 80% of the measured signal comprises photoluminescence generated from the object by the solar irradiation.

The apparatus is preferably configured for measuring a photoluminescence response from an object comprising silicon. In preferred embodiments the apparatus is configured for measuring a photoluminescence response from an object comprising a photovoltaic module comprising a plurality of silicon photovoltaic cells. Preferably, the spectral band has a centre wavelength in the range 1122 to 1130 nm or in the range 1134 to 1136 nm. The spectral band preferably has a FWHM bandwidth of 3.0 nm or less, more preferably 2.0 nm or less, yet more preferably 1.0 nm or less, and still more preferably 0.6 nm or less.

In alternative embodiments the spectral band has a centre wavelength in the range 1367 to 1372 nm, or in the range 1380 to 1383 nm, or in the range 1830 to 1880 nm.

The measurement system preferably comprises a bandpass filter for providing the spectral band. In certain embodiments the measurement system comprises a temperature controller for maintaining the temperature of the bandpass filter within a predetermined temperature range, or for tuning the centre wavelength of the bandpass filter.

Preferably, the apparatus further comprises a computer for interpreting the measured signal to obtain information on one or more properties of the object. In preferred embodiments the measurement system comprises an image capture device.

According to a fifth aspect of the present invention there is provided a method for measuring a photoluminescence response from a silicon sample, the method comprising the steps of:

(i) exposing the silicon sample to solar irradiation to generate photoluminescence from the silicon sample; and
(ii) measuring a signal from the silicon sample in a spectral band having a centre wavelength in the range 1134.0 to 1136.0 nm and a FWHM bandwidth of 3.0 nm or less.

In preferred embodiments the spectral band has a FWHM bandwidth of 2.0 nm or less, more preferably 1.0 nm or less, and yet more preferably 0.6 nm or less.

According to a sixth aspect of the present invention there is provided an apparatus for measuring a photoluminescence response from a silicon sample exposed to solar irradiation, the apparatus comprising a measurement system configured to measure, from a silicon sample exposed to solar irradiation, a signal in a spectral band having a centre wavelength in the range 1134.0 to 1136.0 nm and a FWHM bandwidth of 3.0 nm or less.

In preferred embodiments the spectral band has a FWHM bandwidth of 2.0 nm or less, more preferably 1.0 nm or less, and yet more preferably 0.6 nm or less.

According to a seventh aspect of the present invention there is provided an article of manufacture comprising a non-transitory computer usable medium having a computer readable program code configured to implement the method according to the first aspect, or to operate the apparatus according to the second aspect.

BRIEF DESCRIPTION OF THE DRAWINGS

Preferred embodiments of the invention will now be described, by way of example only, with reference to the accompanying drawings in which:

FIGS. 4A to 4C show images of a sun-illuminated crystalline silicon mini-module acquired with an InGaAs camera equipped with bandpass filters centred around 1135, 1050 and 1200 nm respectively;

DETAILED DESCRIPTION OF THE INVENTION

Figure 1:
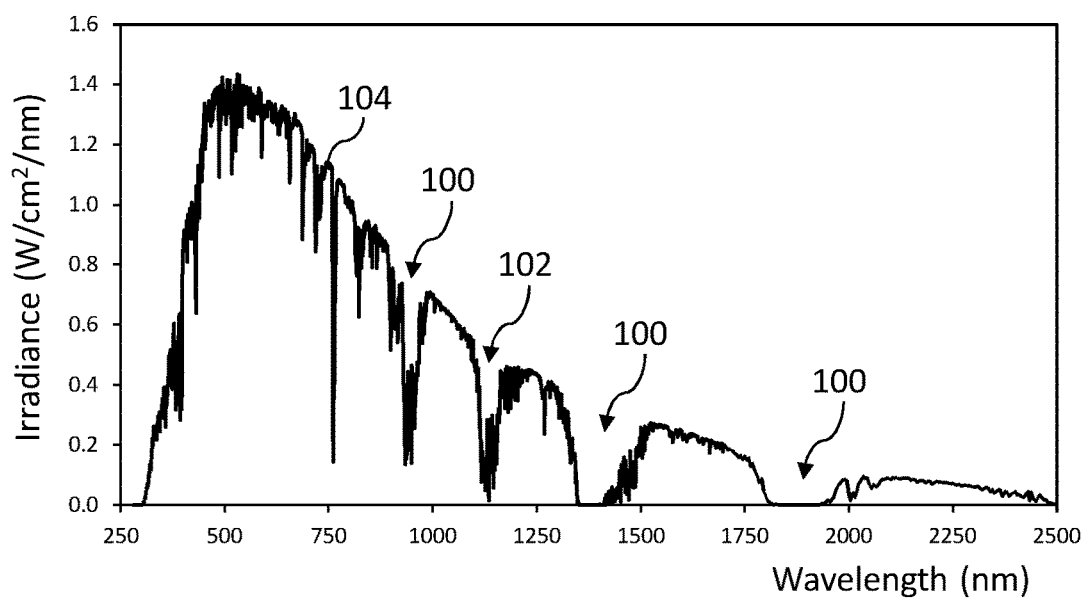
FIG. 1 depicts an AM1.5 solar spectrum showing several atmospheric absorption bands.

FIG. 1 shows an AM1.5 solar spectrum 104, i.e. a representative spectrum of sunlight at sea level, showing several atmospheric absorption bands 100 that are primarily due to water vapour or $CO_2$. Particularly notable is a water vapour absorption band 102 around 1135 nm that fortuitously has significant overlap with a peak region of the band-to-band luminescence spectrum of silicon. As mentioned in the abovementioned paper by Bhoopathy et al, this fortuitous overlap ameliorates but does not eliminate the ambient light problem for outdoor PL inspection of silicon modules. The inventors have realised that this 1135 nm absorption band 102 can be exploited for inspection of installed photovoltaic modules using measurements of photoluminescence generated with solar irradiation, without having to modulate the operating points of the modules.

In a first approach provided in accordance with embodiments of the present invention, referred to as a 'multi-filter' approach, two or more images of a photovoltaic module are acquired with different bandpass filters selected to emphasise a differential between the PL signal and ambient sunlight, allowing significant removal of the ambient sunlight while retaining almost all of the PL signal. More generally, in this 'multi-filter' approach first and second signals from an object exposed to solar irradiation are measured in first and second spectral bands. Each of the first and second signals has a photoluminescence component generated from the object by the solar irradiation and a background component generally comprising reflected solar irradiation, with the first and second spectral bands selected such that the ratio of the photoluminescence component to the background component is higher in the first measured signal than in the second measured signal.

Figure 2:
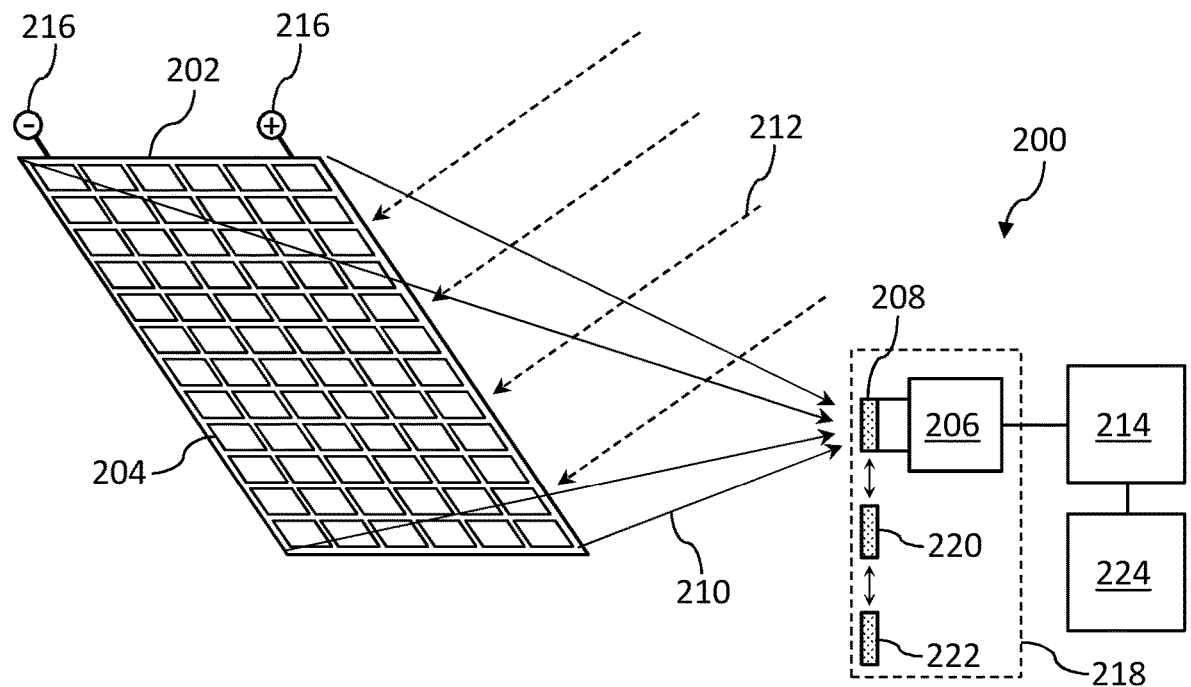
FIG. 2 shows in schematic form an apparatus for outdoor PL inspection of a photovoltaic module according to an embodiment of the invention.

Some specific examples of the multi-filter approach will now be described, for the particular case of outdoor PL imaging of a photovoltaic module comprising a plurality of crystalline silicon cells. FIG. 2 shows in schematic form an apparatus 200 for outdoor PL imaging of a photovoltaic module 202 comprising a plurality of crystalline silicon cells 204. The apparatus 200 comprises a measurement system 218 comprising an image capture device 206 in the form of a camera for imaging light 210 from a photovoltaic module 202 exposed to solar irradiation 212 and one or more interchangeable bandpass filters 208, 220, 222, mounted for example on a filter wheel or other mechanical filter changing means, for selecting the spectral band of the light 210 that reaches the camera 206. The apparatus 200 also comprises a computer 214 equipped with suitable machine readable program code for reading out and processing the image data captured by the camera 206, as described in more detail below. Images or image processing results may be displayed or presented on a display 224. Typically, the light 210 from the module 202 will comprise a mixture of ambient light, generally diffuse or specular reflected sunlight, and PL generated from the silicon cells 204 by the solar irradiation 212, with the task being to discriminate the PL signal from the ambient light. Notably, the apparatus 200 does not require any means for making electrical contact with the module terminals 216 or for modulating the operating points of the photovoltaic module 202 or constituent cells 204 in any way.

Figure 3:
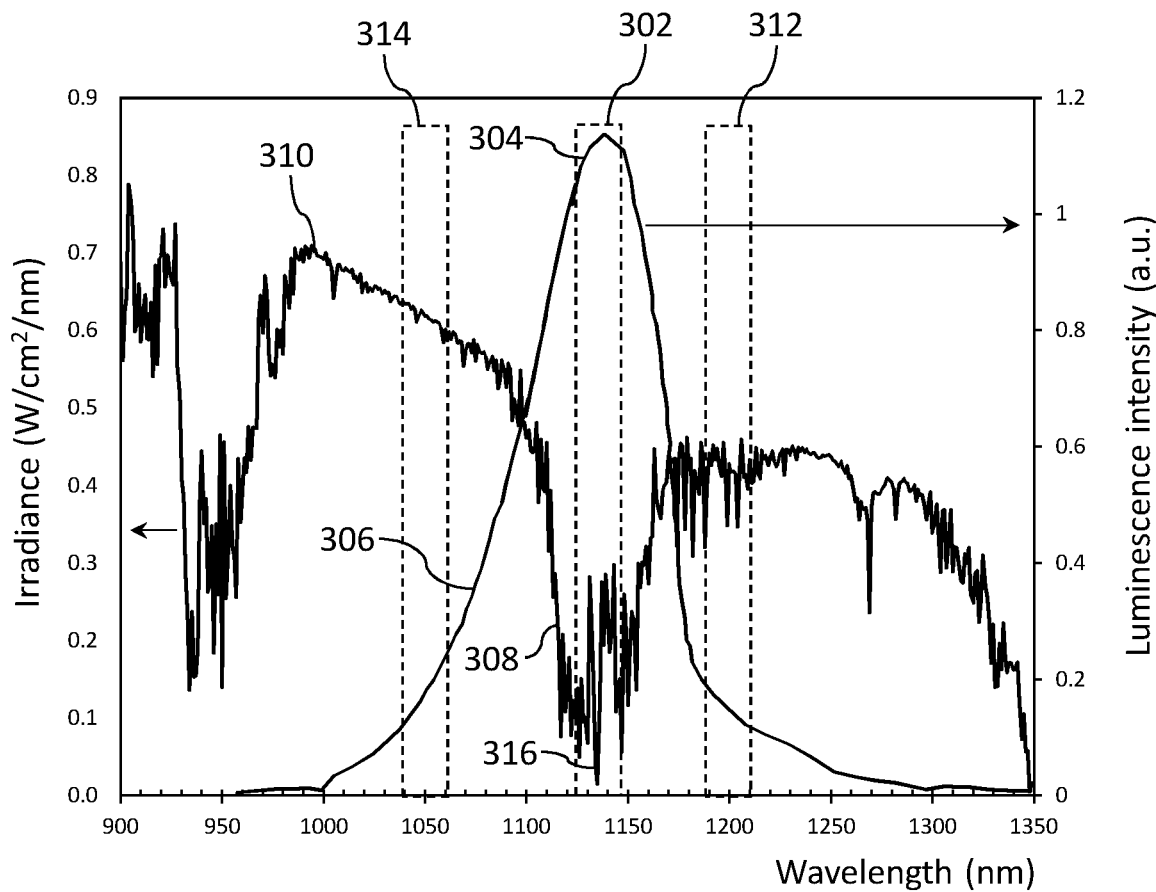
FIG. 3 shows an AM1.5 solar spectrum (left axis), the band-to-band luminescence spectrum of silicon (right axis) and the approximately 25 nm wide transmission bands of various bandpass filters that can be used in the apparatus of FIG. 2.

In an example embodiment the camera 206 acquires two images of the module 202, a first 'standard' image acquired with a first bandpass filter 208 centred at 1135 nm and a second 'red-shifted' image acquired with a second bandpass filter 220 centred at 1200 nm. Alternatively or additionally a third 'blue-shifted' image may be acquired with a third bandpass filter 222 centred at 1050 nm. In this particular example each bandpass filter has a FWHM bandwidth of approximately 25 nm. Henceforth the terminology 'X/Y bandpass filter' will be used to refer to a bandpass filter with centre wavelength X nm and FWHM bandwidth Y nm. Unless specified otherwise, the stated centre wavelengths and FWHM bandwidths of a bandpass filter are at normal incidence and in vacuum. As shown in FIG. 3, the passband 302 of the first, 1135/25 bandpass filter is chosen to overlap with a peak region 304 of the band-to-band luminescence spectrum 306 of silicon, which coincides with a broad and complex water vapour absorption band 308 in the AM1.5 solar spectrum 310. These factors ensure that the ratio of PL intensity to ambient light is relatively high for the 'standard' image acquired with the 1135/25 bandpass filter, although it should be noted that the luminescence and solar spectra 306, 310 are shown on different vertical scales in FIG. 3 so there is no indication of the absolute intensity ratio. To a large extent the absolute intensity ratio will depend on the particular cell/module technology in use and for many current cell types is of order 100:1. The passbands 312, 314 of the second, 1200/25 bandpass filter and third, 1050/25 bandpass filter are preferably chosen with centre wavelengths relatively close to the 1135/25 bandpass filter, but sufficiently removed from the peak region 304 of the luminescence spectrum 306 such that the PL signal makes only a weak contribution to the 'red-shifted' and 'blue-shifted' images. Consequently the ratio of the PL component to the background or ambient component is significantly higher in the standard image than in the red-shifted image or the blue-shifted image, enabling the PL signal to be extracted, or at least enhanced, by differencing in the computer 214. Individual images or a difference image obtained by the differencing process may be displayed or presented on the display 224. Preferably the ratio of the PL component to the background or ambient component in the standard image is at least five times higher, more preferably at least ten times higher, than the corresponding ratio in the red-shifted image or the blue-shifted image.

An example differencing procedure is as follows. The total average image intensities $I_1$ and $I_2$ in two images of an object taken with different bandpass filters can be described as:

$$I_1 = PL_1 + R_1 \quad (1)$$

$$I_2 = PL_2 + R_2 \quad (2)$$

In equations (1) and (2), $PL_1$ and $PL_2$ are the detected PL intensities and $R_1$ and $R_2$ are the detected reflected ambient light intensities in images 1 and 2, respectively. Each image intensity $I_1$, $I_2$ is therefore a linear combination of a PL component and a reflected ambient light component.

A scaling factor C can be defined, such that $C*R_2 = R_1$, to account for the different levels of reflected light in the images taken at different wavelength ranges. Using this relation we find:

$$C*I_2 = C*PL_2 + C*R_2 = C*PL_2 + R_1 \quad (3)$$

Using this relation we can calculate the difference between the first image and the scaled second image as:

$$I_{diff} = I_1 - C * I_2 \quad (4)$$
$$= PL_1 + R_1 - (C * PL_2 + R_1)$$
$$= PL_1 - C * PL_2$$

The difference image $I_{diff}$ calculated according to equation (4) thus represents a photoluminescence intensity difference that is in arbitrary units, importantly without any contribution from reflected ambient light. In alternative embodiments a scaling factor C is calculated and applied to the first image $I_1$ instead of the second image $I_2$. In general the detected reflected ambient light component R in a given image I acquired with a given bandpass filter will depend on a number of factors including the ambient light intensity in the relevant wavelength range, the bandwidth of the filter, the optical elements used to capture the light and the detector sensitivity in the corresponding wavelength region. In the special case that the detected reflected ambient light components $R_1$ and $R_2$ in the first and second images are approximately equal, the scaling factor C will be approximately unity and sufficient cancellation of reflected ambient light may be achieved by simple differencing of the two images.

In certain embodiments a range of different values for the scaling factor C are applied, with guidance from the AM1.5 solar spectrum and the relevant filter passbands for example, and an optimal C found by assessing the quality of the resulting difference images. It is envisioned that a suitable machine learning algorithm could be used to perform this procedure automatically.

FIG. 4A shows an image of a portion of an 8-cell mini-module 402 comprising high efficiency Sunpower IBC cells 404 with several electrically active defects, acquired with a thermo-electrically cooled InGaAs camera (Xeva-1.7-640 from Xenics N.V.) with 640×512 pixels in combination with a 1135/25 bandpass filter. FIGS. 4B and 4C show corresponding 'blue-shifted' and 'red-shifted' images acquired through 1050/25 and 1200/25 bandpass filters, respectively. In each case the images were acquired by averaging twenty 5 ms frames of the InGaAs camera, with the module 402 exposed to solar irradiation of approximately 1 Sun intensity and under $V_{oc}$ condition, i.e. open circuit with no current being extracted through the module terminals. Due to the relatively high luminescence efficiency of the Sunpower cells 404, some electrically active defects 400 are already discernible in the 'standard' image of FIG. 4A. On the other hand neither of the spectrally shifted images of FIG. 4B or FIG. 4C shows any such features, since the PL component was much weaker compared to the ambient component. This is consistent with the general observation that electrically active defects tend not to appear in optical reflection images.

Figure 4D:
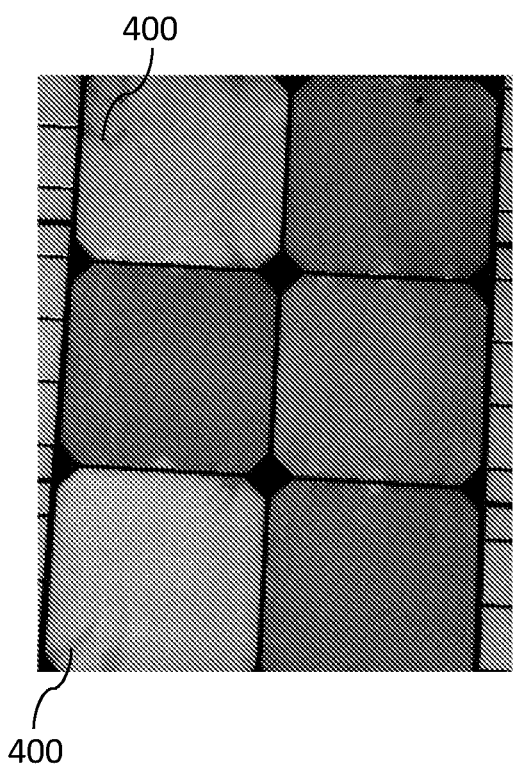
FIG. 4D shows a difference image obtained from the images shown in FIGS. 4A and 4B.
Figure 4E:
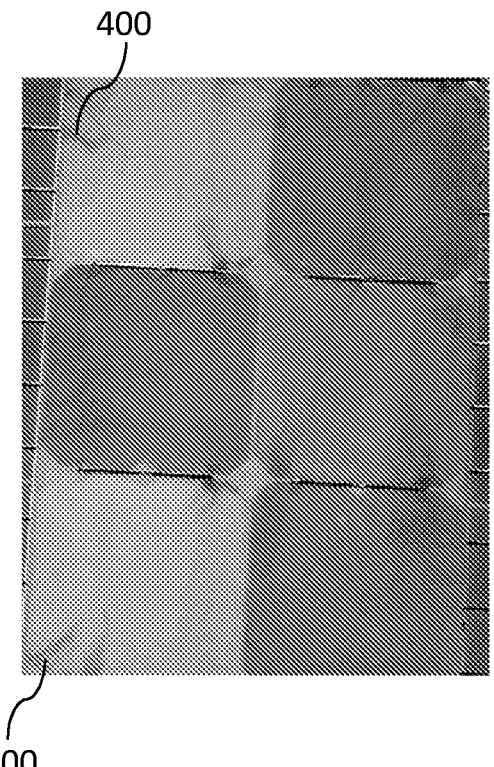
FIG. 4E shows a difference image obtained from the images shown in FIGS. 4A and 4C.

A differencing procedure was then applied in the computer 214 to emphasise the PL component relative to the ambient component. In one example, following the procedure described above with reference to equations (1) to (4), the 'blue-shifted' image of FIG. 4B was multiplied by a scaling factor C=1.01 to account for the different levels of ambient light in the two images, then subtracted from the 'standard' image of FIG. 4A to yield a difference image shown in FIG. 4D. A similar differencing procedure between the 'red-shifted' image of FIG. 4C and the 'standard' image of FIG. 4A, with the red-shifted image multiplied by a scaling factor C=0.80, yielded the difference image shown in FIG. 4E. It can be seen that the contrast of electrically active defect-related features 400 in both FIG. 4D and FIG. 4E is improved relative to that of FIG. 4A, owing to the reduction of the ambient signal component. Close inspection indicates that the defect-related features 400 in the 'standard versus red-shifted' difference image of FIG. 4E are somewhat clearer than in the 'standard versus blue-shifted' difference image of FIG. 4D, possibly because the AM1.5 solar spectrum 310 has a significant slope across the passband 314 of the 1050/25 bandpass filter.

Improved cancellation of the ambient light component may be achievable by differencing the 'standard' image against two or more blue-shifted or red-shifted images acquired in spectral regions with different ambient light intensities, to account for variations in the ambient light intensity on the short- or long-wavelength sides of the luminescence peak.

Figure 5:
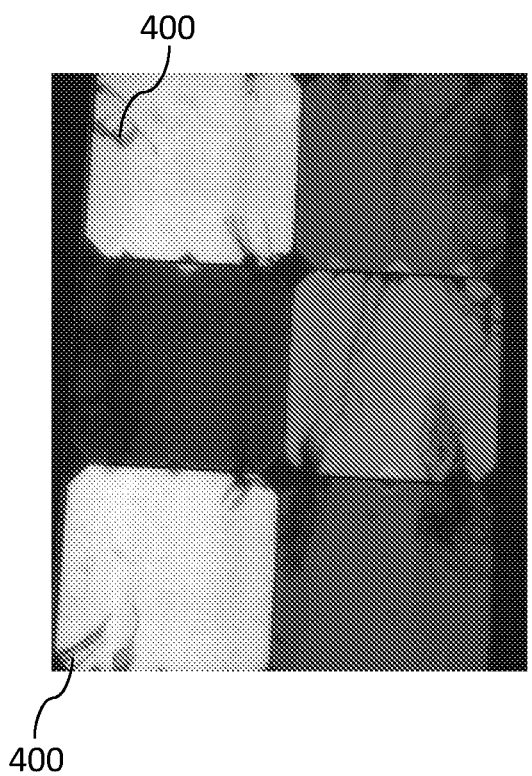
FIG. 5 shows a difference image of the same module as in FIGS. 4A to 4C, obtained using a prior art electrical switching method.

For comparison with the results of the 'multi-filter' method shown in FIGS. 4D and 4E, FIG. 5 shows a difference image of the same module obtained using an electrical switching method described in the abovementioned US 2015/0155829 A1. Specifically, the image shown in FIG. 5 was obtained by subtracting a '$J_{sc}$' image, i.e. an image acquired with the module switched to the short circuit condition, which essentially comprises ambient light only, from a '$V_{oc}$' image, i.e. an image acquired with the module switched to the open circuit condition. Both the $J_{sc}$ and $J_{oc}$ images were captured with a camera fitted with the same 1135/25 bandpass filter used to acquire the PL image shown in FIG. 4A. While the 'electrically switched' difference image of FIG. 5 has better contrast than either of the 'multi-filter' difference images of FIGS. 4D and 4E, essentially all of the electrically active defect-related features 400 visible in FIG. 5 are also visible at least in FIG. 4E. As noted previously our 'multi-filter' method has the distinct advantage of not requiring any switching of the operating point of the module under test.

The image contrast achievable with the 'multi-filter' method may be improved by using different spectral filters, for example filters with narrower passbands or with centre wavelengths that are closer to each other, than the ones used in the above example embodiment. It will be appreciated from the interplay between the AM1.5 solar spectrum 310 and the silicon luminescence spectrum 306 shown in FIG. 3 that there is considerable flexibility in the selection of the spectral bands 302, 312 and 314 for the 'standard', 'red-shifted' and 'blue-shifted' images respectively. For example the spectral band 302 for the 'standard' image could be chosen to be centred around a wavelength in the range 1120 to 1160 nm, more preferably in the range 1130 to 1140 nm, while the spectral bands 312, 314 for the 'red-shifted' and 'blue-shifted' images could be chosen to be centred around wavelengths in the ranges 1160 to 1250 nm and 1000 to 1120 nm respectively, more preferably in the ranges 1190 to 1210 nm and 1040 to 1060 nm. Furthermore, the widths of the spectral bands 302, 312 and 314 could be greater or less than the 25 nm widths provided by the specific bandpass filters in the above example.

With reference to FIG. 2 and as mentioned previously, the image displayed in FIG. 4A was acquired with the combination of an InGaAs camera 206 and a filter 208 having a pass band approximately 25 nm wide centred at 1135 nm. FIG. 4A shows that some electrically active defects 400 can be discerned in daylight images acquired with this 1135/25 bandpass filter, at least for modules with high efficiency silicon cells. For more reliable detection of defects, however, it is generally preferable to improve the contrast by suppressing the background ambient light by differencing against one or more additional images, acquired for example at different operating points as in the prior art, or in different wavelength bands as in the above described multi-filter method. Basically, despite its 25 nm passband being within a broad water vapour absorption band 308, the standard 1135/25 bandpass filter still passes an undesirably high amount of reflected sunlight. For example while the PL component in the image of FIG. 4A is around 7%, with the balance being reflected sunlight, in more common industrial quality crystalline silicon solar modules under similar conditions the PL component is likely to be only about 1 or 2%, meaning that about 99 or 98% of the measured signal would be reflected sunlight. We note that the PL component of an image acquired from a given module at a given operating point can be estimated by comparison with an image of the same module switched to $J_{sc}$.

Figure 6:
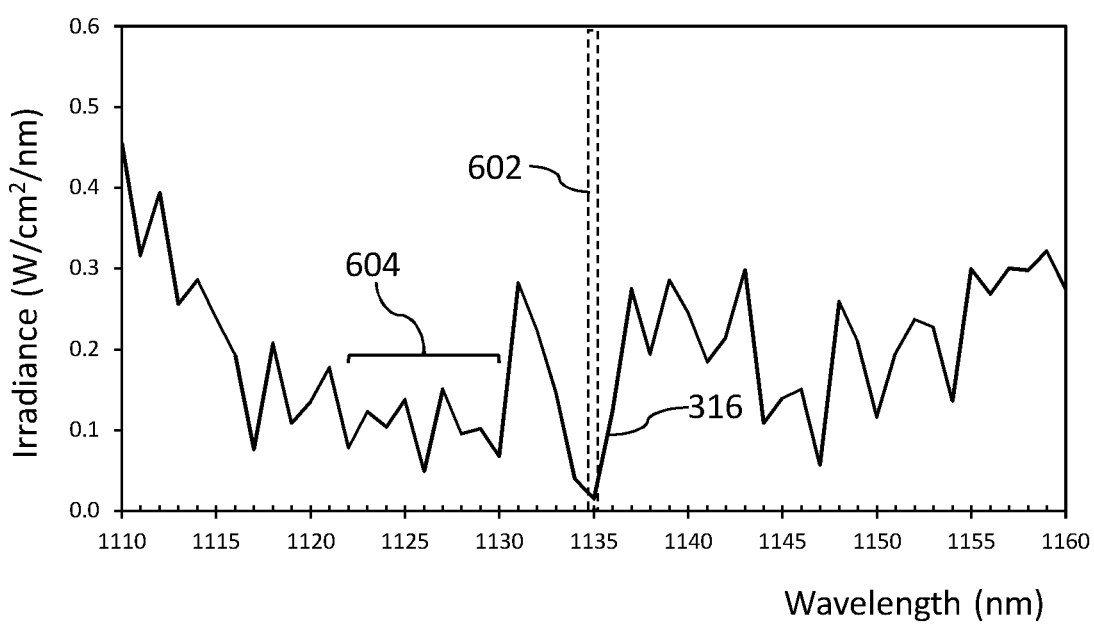
FIG. 6 shows an AM1.5 solar spectrum over a narrower wavelength range than in FIG. 3, along with the approximately 0.4 nm wide transmission band of a specially designed bandpass filter positioned within a narrow region of particularly strong atmospheric absorption.

The inventors have realised that much better rejection of reflected sunlight, and therefore much improved contrast of electrically active defect-related features in a silicon photovoltaic cell or module, can be achieved with a customised narrow bandpass filter designed to coincide with a deep, narrow absorption band 316 at around 1134 to 1136 nm that is difficult to discern in the AM1.5 spectrum 310 of FIG. 3, but clearly discernible in the narrower range spectrum of FIG. 6. With modern dielectric coating technologies bandpass filters with FWHM passbands as narrow as ~0.2 nm are manufacturable. Filters with such demanding specifications are often referred to as 'ultra-narrow bandpass' (UNBP) filters. The inventors have modelled the application to PL measurements on silicon of a 1135/0.4 bandpass filter with centre wavelength (1135±0.05) nm, FWHM (0.4±0.1) nm and a rejection of 70 dB (i.e. OD7) or more outside the passband. The positioning of the passband 602 of this filter design with respect to the narrow absorption band 316 is shown in FIG. 6. If necessary for optimal matching with the absorption band 316, the exact position of the passband 602 can be blue-shifted to some extent by adjusting the angle of incidence away from the normal, although the sharpness of the band edges tends to degrade beyond angles of incidence of 3 or 4 degrees. Alternatively, the passband position can be fine-tuned in either direction by adjusting the temperature of the filter, at a rate of approximately 0.1 nm/10° C. Another region that could be targeted with an appropriately designed bandpass filter is the high atmospheric absorption region 604 around 1122 to 1130 nm.

For outdoor PL imaging of silicon photovoltaics the efficacy of the 1135/0.4 bandpass filter design, or more generally for any approach that seeks to exploit a water vapour absorption band, will depend on the amount of water vapour between the sun and the module. A convenient measure of this is the water vapour column (WVC), the amount of water vapour in a vertical column of air if that water vapour were present in condensed form, usually expressed in units of cm. WVC is dependent on a number of factors including latitude, altitude, season and time of day, and can be multiplied by an 'air mass' factor to account for the angle of incidence of the sun to yield an effective WVC. At sea level in temperate latitudes, and away from dawn and dusk when the sun is of limited use for generating PL, WVC*air mass values in the range of 2.5 to 3 cm are common.

Figure 7A:
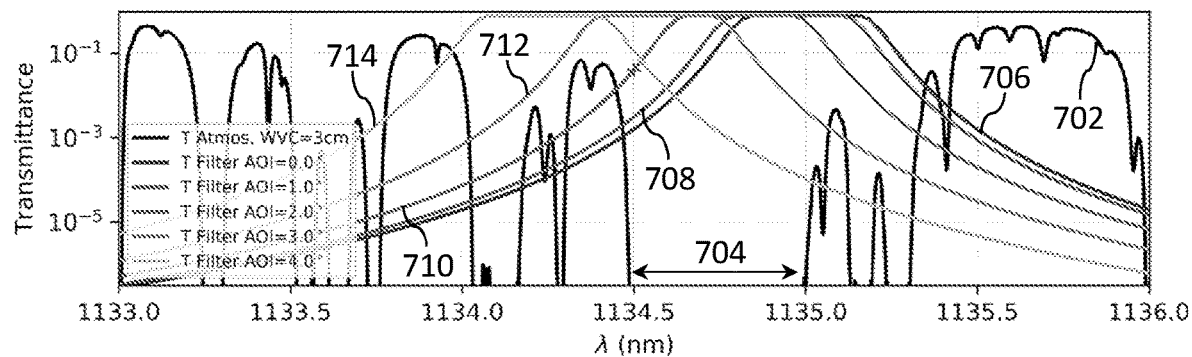
FIGS. 7A and 7B show modelling results of the performance of a bandpass filter specially designed for measurements of PL from silicon.
Figure 7B:
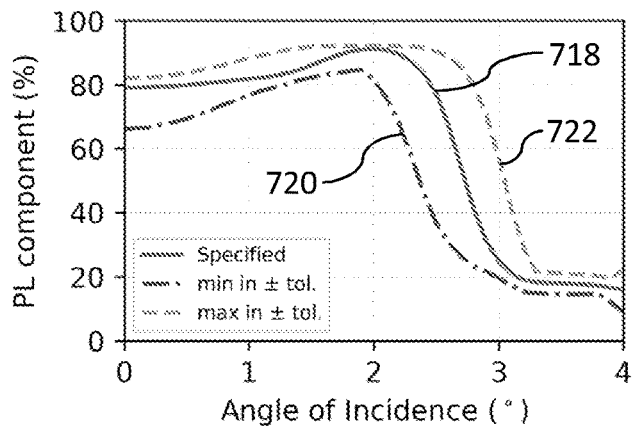

Beginning with an assumption that a signal from a module with crystalline silicon cells measured through a 1135/25 bandpass filter in local conditions of 1 Sun illumination and WVC*air mass=3 cm has a PL component of 1%, some modelling results of the performance of a 1135/0.4 bandpass filter are shown in FIGS. 7A and 7B. FIG. 7A depicts a plot, on a logarithmic scale, of the atmospheric transmittance 702 in the range 1133 to 1136 nm, including a portion 704 with transmittance below $10^{-7}$ in the 1134.5 to 1135.0 region targeted with the 1135/0.4 bandpass filter. Also shown in FIG. 7A is the effect on the passband of a dielectric 1135/0.4 filter for variations in angle of incidence (AOI), with curves 706, 708, 710, 712 and 714 depicting the passband for angles of incidence of 0°, 1°, 2°, 3° and 4° respectively. The blue-shift of the passband with increasing AOI can be clearly seen. Because of this effect it may be beneficial to select a bandpass filter with centre wavelength slightly red-shifted with respect to the low transmittance window 704. FIG. 7B depicts a plot 718 of the expected PL component as a function of incidence angle of a signal acquired through a 1135/0.4 bandpass filter with 1 Sun illumination and WVC*air mass=3 cm, with 'tolerance' plots 720, 722 representing the corresponding calculations for filters with centre wavelengths 1135.2 nm and 1134.8 nm. Plot 718 for example suggests that the PL component can exceed 80% for angles of incidence in a range of approximately 0.5° to 2.4°, or even 90% at around 2°. That is, the desired PL component can be approximately four to nine times larger than the unwanted ambient light component, in which case features related to electrically active defects should be easily distinguishable.

Figure 8:
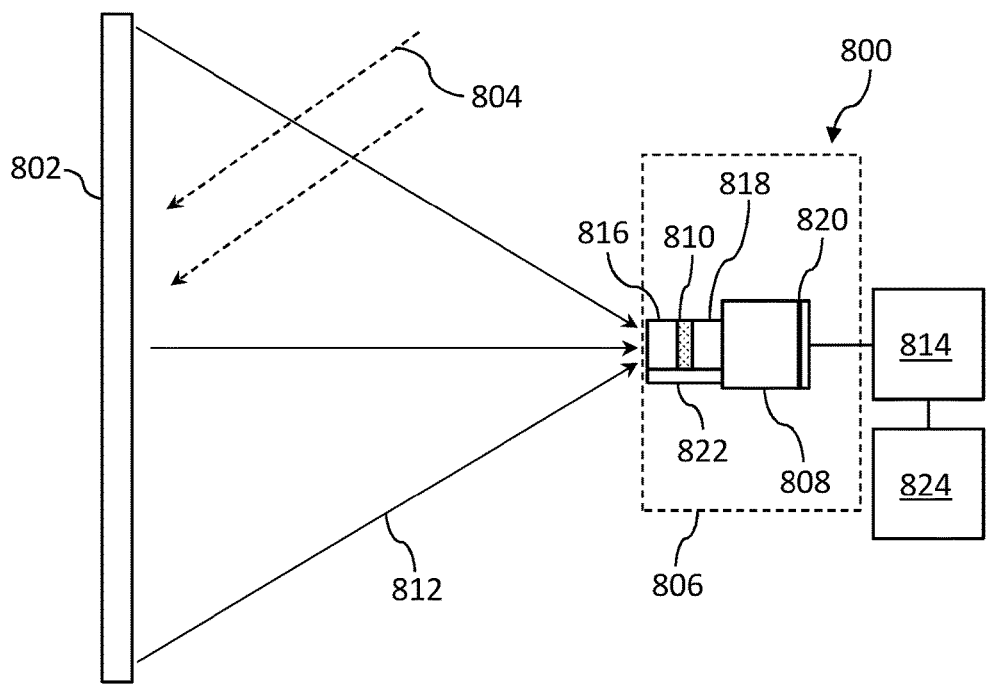
FIG. 8 shows in schematic form an apparatus for outdoor PL inspection of a photovoltaic module according to an embodiment of the invention.

In accordance with this 'single filter' approach, FIG. 8 shows in schematic form an apparatus 800 for measuring a PL response from an object 802 exposed to solar irradiation 804, according to an embodiment of the present invention, in particular for acquiring an image of PL generated by solar irradiation of a photovoltaic module comprising silicon photovoltaic cells. The apparatus 800 comprises a measurement system 806 comprising an image capture device 808 in the form of a camera and one or more filters 810 for selecting a spectral band in which light 812 from a photovoltaic module 802 under solar irradiation 804 reaches the camera 808. The apparatus may also comprise a computer 814 equipped with suitable machine readable program code for reading out the signal measured by the camera 808 and interpreting the measured signal to obtain information on one or more properties of the module 802, such as the prevalence or location of various types of defects, typically for presentation on a display 824. The one or more filters 810 are preferably selected such that at least 20% of the measured signal comprises PL generated from the module 802 by the solar irradiation 804. More preferably, the one or more filters 810 are selected such that at least 50%, yet more preferably at least 80%, of the measured signal comprises PL generated from the module 802 by the solar irradiation 804.

In a particularly preferred embodiment, suitable for when the object 802 comprises a photovoltaic module comprising a plurality of silicon photovoltaic cells, the one or more filters 810 are selected to pass a spectral band having a centre wavelength in the range 1134.0 to 1136.0 nm, more preferably in the range 1134.5 to 1135.5 nm, and a FWHM bandwidth of 3.0 nm or less, more preferably 2.0 nm or less, yet more preferably 1.0 nm or less and still more preferably 0.6 nm or less. In another embodiment the one or more filters 810 are selected to pass a spectral band having a centre wavelength in the range 1122 to 1130 nm, targeting the high atmospheric absorption region 604. A required spectral passband can conveniently be provided by a bandpass filter, but many other possibilities will occur to those skilled in the art, including combinations of long-pass filters and short-pass filters. In view of the narrowness of the deep absorption band 316 shown in FIG. 3, and the sensitivity of the performance of dielectric filters such as bandpass filters to the angle of incidence as shown in FIG. 7A, it may be advantageous to limit the range of angles of incidence. Accordingly, in a preferred embodiment the one or more filters 810 are positioned between a system of collimating optics 816 and a system of imaging optics 818. This enables light 812 from a photovoltaic module 802 to be collimated with the system of collimating optics 816 for passage through the one or more filters 810, then imaged onto the focal plane 820 of the camera 808 with the system of imaging optics 818. In practice it is difficult if not impossible to achieve perfect collimation across a finite aperture, leading to a compromise between aperture size for sufficient signal and range of incidence angles for acceptable filter performance. The inventors have found that satisfactory results can be obtained for example with a two degree range of incidence angles, e.g. ±1°, over a 5 mm aperture. In certain embodiments, especially for use in particularly hot or cold climates, the measurement system 806 also comprises a temperature controller 822 for maintaining the temperature of the one or more filters 810 within a predefined temperature range. This is because the passband of dielectric bandpass filters, for example, can shift significantly relative to the target absorption band 316 with temperature variations of order 10° C. Alternatively, the temperature controller 822 may be used to fine-tune the position of a passband provided by the one or more dielectric filters 810.

An actual measurement system 806 was assembled with a thermo-electrically cooled InGaAs camera 808 and a custom-designed 1134.98/0.34 bandpass filter 810 positioned between a system of collimating optics 816 comprising two identical f=74.3 mm doublet lenses adjusted to provide a 5 mm aperture and imaging optics 818 comprising an industrial f=50 mm lens, with temperature control of the lens tube maintaining the temperature of the filter 810 within an operating range of approximately 25 to 35° C. Additional 1000 nm long-pass and 1400 nm short-pass filters were placed in front of the collimating optics 816 to reduce spurious PL signals from the filter-lens system and further reduce ambient light.

Figure 9:
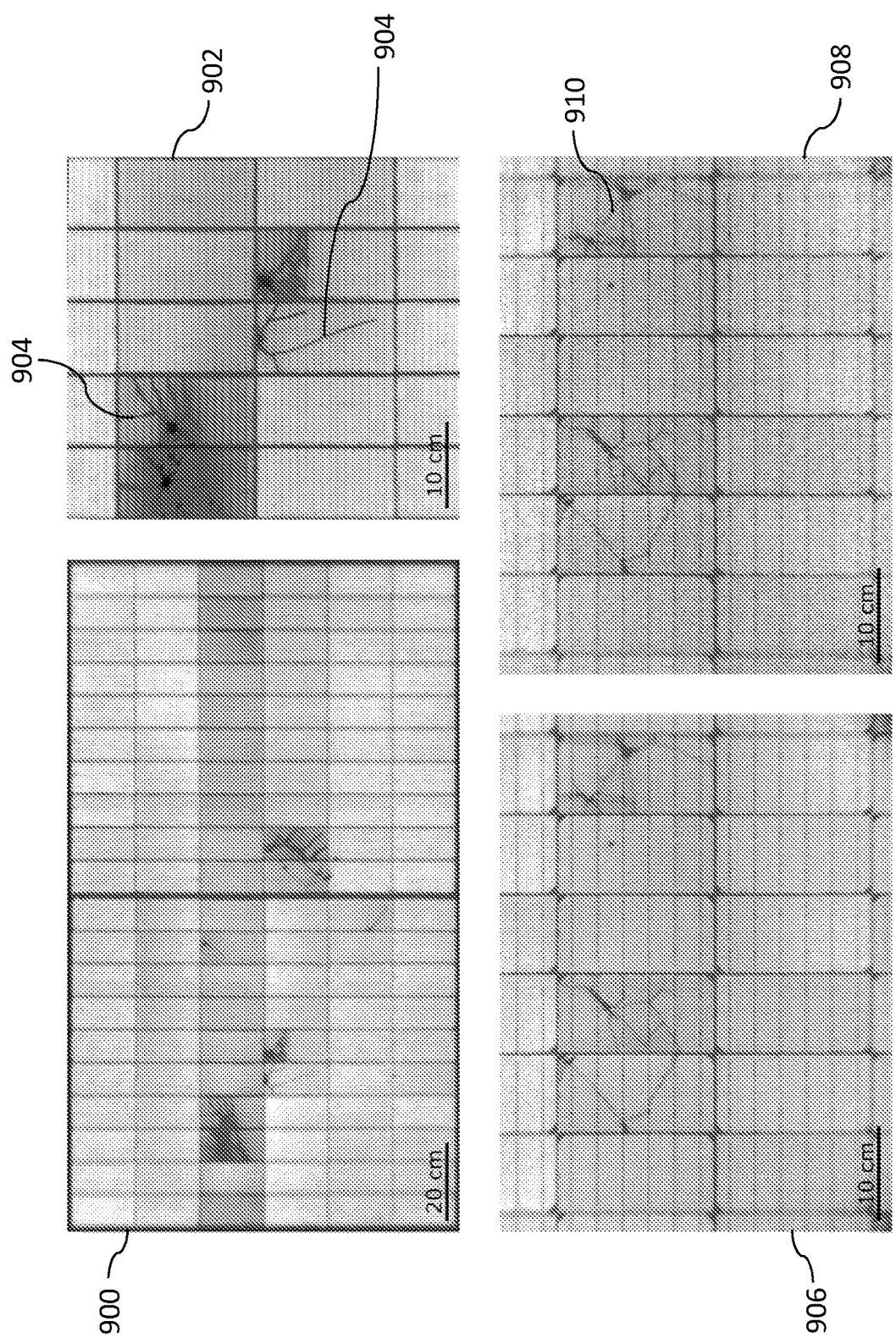
FIG. 9 shows PL images of two damaged solar-illuminated crystalline silicon modules acquired with an InGaAs camera equipped with a bandpass filter having centre wavelength (1134.98±0.03) nm and full width half maximum (FWHM) bandwidth 0.34 nm.

This custom-designed measurement system was applied to two commercially available monocrystalline silicon half-cell photovoltaic modules under solar irradiation, one module containing so-called passivated emitter and rear contact (PERC) cells and the other containing heterojunction (HJT) cells, each with a number of intentionally induced cracks. PL images acquired from these modules under open circuit conditions in full daylight, and with a module-to-camera working distance of approximately 8 m, are shown in FIG. 9. Image 900 was obtained from the full area of the HJT module with a 20 s acquisition time, with a close-up 902 showing some of the cracked cells 904. Images 906 and 908 show close-ups of PL images obtained from the PERC module with acquisition times of 50 s and 1 s respectively. While the longer acquisition time yields a better quality image, cell microcracks 910 are clearly discernible in the 1 s acquisition time image 908. It should be noted that the microcracks were not visible to the naked eye or with conventional optical inspection systems. Interestingly, the PL signal was observed to increase significantly with shorter module-to-camera working distance, consistent with an optical absorption length of 12 m in the wavelength range passed by the 1134.98/0.34 bandpass filter 810, illustrating the strength of the water vapour absorption band 316.

Figure 10:
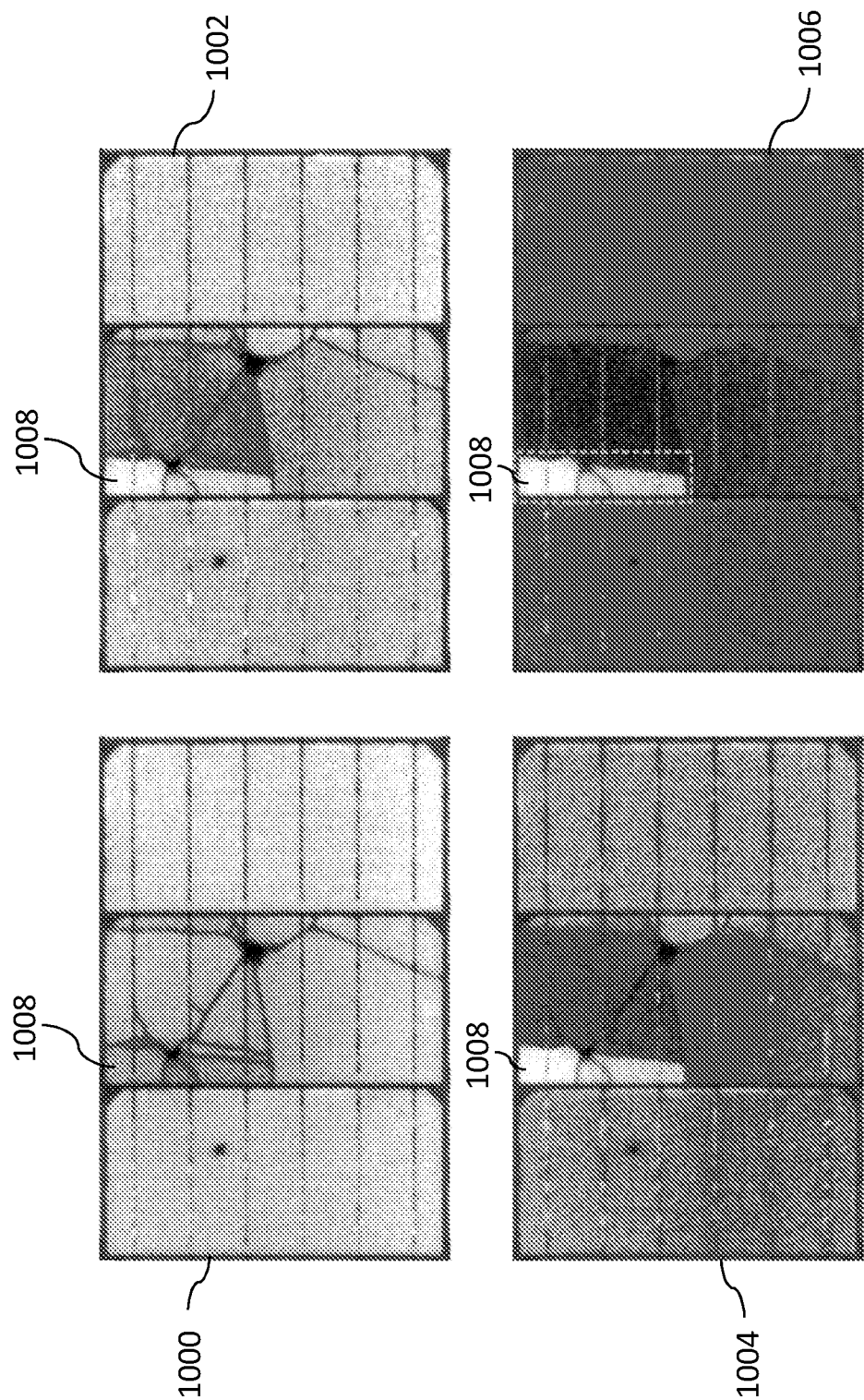
FIG. 10 shows PL images of three half-cells of a damaged crystalline silicon module exposed to solar irradiation under current extraction conditions of 0, 4, 6 and 8 A respectively, acquired with an InGaAs camera equipped with a bandpass filter having centre wavelength (1134.98±0.03) nm and FWHM bandwidth 0.34 nm.

The outdoor PL images shown in FIG. 9 were acquired with the modules under open circuit conditions, i.e. with no current extraction, which is advantageous for PL signal intensity. However while open circuit PL images are well-suited for detecting carrier lifetime-related features such as reduced lifetime material bordering microcracks 910, they tend not to reveal defects such as broken metal contacts or electrically isolated cell regions that impede carrier extraction. Such 'series resistance' related features are more readily detected in PL images acquired at different cell/module operating points, such as under current extraction conditions, although current extraction also reduces the overall PL intensity, further increasing the challenge for outdoor PL imaging. FIG. 10 shows four PL images 1000, 1002, 1004 and 1006 of three half-cells of a PERC module exposed to solar irradiation, captured with the same InGaAs camera/bandpass filter measurement system with 20 s acquisition times, under current extraction conditions of 0 A (i.e. open circuit), 4 A, 6 A and 8 A respectively. The area 1008 having relative brightness increasing with increasing current extraction is indicative of a cell region that has been isolated by cracking of the cell. We note that although an electrical contacting method was used here, current extraction conditions in photovoltaic modules can alternatively be achieved using optical switching techniques, as described in R. Bhoopathy et al 'Outdoor photoluminescence imaging of solar panels by contactless switching: Technical considerations and applications', *Prog. Photovolt. Res. Appl.* 28, 217-228 (2020).

From the results of FIGS. 9 and 10 we reach the remarkable conclusion that spatially resolved information on sunlight-generated PL from photovoltaic modules with crystalline silicon cells, including information on cracks or series resistance-related defects detrimental to module performance, can be obtained in a single image with acquisition times as low as 1 second and without any need to modulate the operating point of individual modules to discriminate the PL signal from ambient sunlight. Acquisition times of order 0.1 seconds appear feasible with improvements in the measurement system and the development of cell designs with higher open circuit voltages.

While an ultra-narrow passband is conveniently provided by a so-called UNBP filter, in alternative embodiments an ultra-narrow passband may be provided by equivalent filter combinations such as a combination of a long-pass filter and a short-pass filter with sharp transitions. The long-pass and short-pass filters could be angle-tuned independently for more precise control of the passband. Likewise, the different passbands in the 'multi-filter' method could be provided by various combinations of long-pass and short-pass filters rather than bandpass filters. For example a PL signal within a particular passband can be obtained by the subtraction of the signals measured with two different edge filters, e.g. two long-pass filters or two short-pass filters, with slightly different filter edges (i.e. cut-on or cut-off wavelengths). Spectral bands may also be selected with dielectric mirrors or other wavelength-selective reflective structures. In certain embodiments the above described multi-filter method may be implemented with two so-called UNBP filters, a first with passband 602 positioned within a deep, narrow absorption band 316 as shown in FIG. 6 and a second with passband still close to the peak region 304 of the silicon PL spectrum but with a much higher level of reflected ambient light.

Important design features of a bandpass filter include the width, position and angular behaviour and temperature sensitivity of its passband, and in particular the width of the passband compared to the width of a window in which the atmospheric transmittance is sufficiently low, such as the window 704 shown in FIG. 7A. The criterion of 'sufficiently low atmospheric transmittance' will depend on various factors including the PL efficiency of the material under test and the minimum acceptable PL component in a detected signal. For example it should be easier to achieve single image outdoor PL inspection of objects comprising materials with a higher PL efficiency than silicon but with a PL wavelength range overlapping a strong atmospheric absorption band, or under high WVC conditions, or if an acceptable lower limit for the PL component were to be, say, 20% or 50% rather than 80%. In general an acceptable level of the PL component in an image of an object exposed to solar irradiation will vary depending on the application. For some applications a PL component of 20% or more will be acceptable, while in other applications an acceptable level of PL may be at least 50% or at least 80%. Referring to the AM1.5 solar spectrum 104 in FIG. 1, single image daylight PL inspection may also be possible for materials having significant PL emission around 1375 nm or 1875 nm coinciding with relatively broad regions where the solar irradiance is extremely low because of water vapour or $CO_2$ absorption.

Although the 'multi-filter' and 'single filter' methods of the present invention have been described with reference to outdoor PL inspection of photovoltaic modules comprising silicon cells, and in particular to spatially resolved PL measurements on such modules for the purpose of defect inspection, the methods have much broader applicability. For example they have applicability to non-imaging PL measurements in which signals can be detected with photodiodes or the like, such as for the Suns-PL technique described in Trupke et al 'Suns-photoluminescence: Contactless determination of current-voltage characteristics of silicon wafers', *Appl. Phys. Lett.* 87, 093503 (2005), as well as to photovoltaic modules based on materials other than silicon, such as CdTe and CIGS. Sunlight extends from the near UV, through the visible and well into the IR region of the electromagnetic spectrum and can generate PL from a wide range of materials other than semiconductors, including inorganic, organic and biological materials. The above-described methods for outdoor PL inspection may therefore provide information on the presence or properties of particular species or matter such as contaminants, ripeness indicators, bacteria or viruses in objects such as fruit, plants, landscapes, buildings or bodies of water for example. The single filter method may be particularly applicable for detecting species or matter with PL emission bands overlapping with atmospheric absorption regions around 1375 or 1875 nm for which a bandpass filter may be designed. Of particular interest, for example, may be the strong absorption bands at 1367-1372 nm and 1380-1383 nm within the broad absorption around 1375 nm, or the 1830-1880 nm region of the absorption band around 1875 nm. The class of imaging camera or photodetector used, e.g. InGaAs, Ge or mercury cadmium telluride, can be chosen with reference to the target PL emission band.

Generally, when targeting a given atmospheric absorption band with a pass band provided by a bandpass filter or similar, an acceptable level of PL such as 20% or more will be easier to achieve from materials having higher PL efficiency. For example a lower efficiency material may require a bandpass filter with FWHM bandwidth of 1.0 nm or less, whereas a bandpass filter with FWHM bandwidth of 3.0 nm or less, 5.0 nm or less or even 10.0 nm or less may suffice for a higher efficiency material.

The extremely tight pass bands offered by so-called UNBP filters may also enable measurement of Raman signals from various materials under sunlight excitation, instead of the monochromatic laser excitation traditionally required for efficient spectral separation of scattered excitation light from the Raman signals that are orders of magnitude weaker.

Although the invention has been described with reference to specific examples, it will be appreciated by those skilled in the art that the invention may be embodied in many other forms.

The claims defining the invention are as follows:

1. A method for measuring a photoluminescence response from an object, the method comprising the steps of:
   (i) exposing the object to solar irradiation to generate photoluminescence from the object; and
   (ii) measuring a signal from the object in a spectral band selected such that at least 20% of the measured signal comprises photoluminescence generated from the object by the solar irradiation,
   wherein the object comprises a photovoltaic module comprising a plurality of silicon photovoltaic cells.

2. The method according to claim 1, wherein the spectral band is selected such that at least 50% of the measured signal comprises photoluminescence generated from the object by the solar irradiation.

3. The method according to claim 2, wherein the spectral band is selected such that at least 80% of the measured signal comprises photoluminescence generated from the object by the solar irradiation.

4. The method according to claim 1, wherein the spectral band has a centre wavelength in the range 1122 to 1130 nm or in the range 1134 to 1136 nm.

5. The method according to claim 1, wherein the spectral band has a FWHM bandwidth of 3.0 nm or less.

6. The method according to claim 5, wherein the spectral band has a FWHM bandwidth of 2.0 nm or less.

7. The method according to claim 6, wherein the spectral band has a FWHM bandwidth of 1.0 nm or less.

8. The method according to claim 7, wherein the spectral band has a FWHM bandwidth of 0.6 nm or less.

9. The method according to claim 1, wherein the spectral band has a centre wavelength in the range 1367 to 1372 nm, or in the range 1380 to 1383 nm, or in the range 1830 to 1880 nm.

10. The method according to claim 1, wherein the spectral band is provided by a bandpass filter.

11. The method according to claim 10, wherein the temperature of the bandpass filter is maintained within a predetermined temperature range.

12. The method according to claim 10, wherein the temperature of the bandpass filter is controlled to tune the centre wavelength of the bandpass filter.

13. The method according to claim 1, further comprising the step of interpreting the measured signal to obtain information on one or more properties of the object.

14. The method according to claim 1, wherein the signal is measured with an image capture device.

15. An apparatus for measuring a photoluminescence response from an object exposed to solar irradiation, the apparatus comprising a measurement system for measuring a signal from the object exposed to solar irradiation, the signal being measured in a spectral band selected such that at least 20% of the measured signal comprises photoluminescence generated from the object by the solar irradiation, wherein the object comprises a photovoltaic module comprising a plurality of silicon photovoltaic cells.

16. The apparatus according to claim 15, wherein the spectral band is selected such that at least 50% of the measured signal comprises photoluminescence generated from the object by the solar irradiation.

17. The apparatus according to claim 16, wherein the spectral band is selected such that at least 80% of the measured signal comprises photoluminescence generated from the object by the solar irradiation.

18. The apparatus according to claim 15, wherein the spectral band has a centre wavelength in the range 1122 to 1130 nm or in the range 1134 to 1136 nm.

19. The apparatus according to claim 15, wherein the spectral band has a FWHM bandwidth of 3.0 nm or less.

20. The apparatus according to claim 19, wherein the spectral band has a FWHM bandwidth of 2.0 nm or less.

21. The apparatus according to claim 20, wherein the spectral band has a FWHM bandwidth of 1.0 nm or less.

22. The apparatus according to claim 21, wherein the spectral band has a FWHM bandwidth of 0.6 nm or less.

23. The apparatus according to claim 15, wherein the spectral band has a centre wavelength in the range 1367 to 1372 nm, or in the range 1380 to 1383 nm, or in the range 1830 to 1880 nm.

24. The apparatus according to claim 15, wherein the measurement system comprises a bandpass filter for providing the spectral band.

25. The apparatus according to claim 24, wherein the measurement system comprises a temperature controller for maintaining the temperature of the bandpass filter within a predetermined temperature range, or for tuning the centre wavelength of the bandpass filter.

26. The apparatus according to claim 15, further comprising a computer for interpreting the measured signal to obtain information on one or more properties of the object.

27. The apparatus according to claim 15, wherein the measurement system comprises an image capture device.

* * * * *